United States Patent
Jozaki et al.

(10) Patent No.: US 8,298,119 B2
(45) Date of Patent: Oct. 30, 2012

(54) CONTINUOUSLY VARIABLE TRANSMISSION AND CONTROL METHOD THEREOF

(75) Inventors: Tateki Jozaki, Yokohama (JP); Hideaki Suzuki, Yokohama (JP); Ryousuke Nonomura, Kawasaki (JP); Mamiko Inoue, Machida (JP); Seiichiro Takahashi, Isehara (JP); Tatsuo Ochiai, Oiso-machi (JP); Masato Koga, Hiratsuka (JP); Masaaki Uchida, Yokosuka (JP); Ryoji Kadono, Kawasaki (JP)

(73) Assignees: Jatco Ltd, Fuji-shi (JP); Nissan Motor Co., Ltd., Yokohama-shi (JP)

( * ) Notice: Subject to any disclaimer, the term of this patent is extended or adjusted under 35 U.S.C. 154(b) by 336 days.

(21) Appl. No.: 12/727,500

(22) Filed: Mar. 19, 2010

(65) Prior Publication Data

US 2010/0248895 A1    Sep. 30, 2010

(30) Foreign Application Priority Data

Mar. 27, 2009    (JP) .................................. 2009-079676

(51) Int. Cl.
*B60W 10/04* (2006.01)
*B60W 10/10* (2012.01)
(52) U.S. Cl. ................................ 477/41; 477/43; 477/46
(58) Field of Classification Search ................... 477/41, 477/43, 46, 98
See application file for complete search history.

(56) References Cited

U.S. PATENT DOCUMENTS

| | | | |
|---|---|---|---|
| 4,672,863 A | 6/1987 | Itoh et al. | |
| 4,674,359 A | 6/1987 | Hattori | |
| 4,685,358 A | 8/1987 | Itoh | |
| 4,793,217 A | 12/1988 | Morisawa et al. | |
| 5,820,514 A | 10/1998 | Adachi | |
| 6,314,357 B1 | 11/2001 | Kon et al. | |
| 6,821,228 B2 * | 11/2004 | Aoki et al. | 477/44 |
| 6,855,085 B1 | 2/2005 | Gumpoltsberger | |
| 6,932,739 B2 * | 8/2005 | Miyata et al. | 477/41 |
| 7,108,631 B2 | 9/2006 | Inoue et al. | |
| 7,393,306 B2 | 7/2008 | Tanaka | |
| 7,637,836 B2 | 12/2009 | Watanabe et al. | |
| 7,833,126 B2 * | 11/2010 | Venter | 477/39 |
| 8,055,414 B2 | 11/2011 | Tawara | |
| 2002/0011792 A1 | 1/2002 | Taniguchi et al. | |

(Continued)

FOREIGN PATENT DOCUMENTS

DE    199 41 009 A1    3/2001

(Continued)

OTHER PUBLICATIONS

U.S. Appl. No. 12/727,497, filed Mar. 19, 2010, Jozaki et al.

(Continued)

*Primary Examiner* — Edwin A Young
(74) *Attorney, Agent, or Firm* — Foley & Lardner LLP

(57) ABSTRACT

The transmission controller changes the gear position of the subtransmission mechanism and varies the speed ratio of the variator in an opposite direction to a speed ratio variation direction of the subtransmission mechanism when the actual through speed ratio passes a predetermined mode switch line. When the improvement in the shift response of the continuously variable transmission is determined to be required and the actual through speed ratio passes the mode switch line from a Low side to the High side, the transmission controller increases a shift speed of the subtransmission mechanism compared with a normal coordinated shift.

15 Claims, 7 Drawing Sheets

U.S. PATENT DOCUMENTS

| | | |
|---|---|---|
| 2005/0085340 A1* | 4/2005 | Ishikawa et al. ................ 477/41 |
| 2006/0217230 A1 | 9/2006 | Tanaka |
| 2009/0042690 A1 | 2/2009 | Tabata et al. |
| 2009/0105041 A1 | 4/2009 | McKenzie et al. |
| 2010/0248895 A1 | 9/2010 | Jozaki et al. |
| 2011/0015033 A1 | 1/2011 | Nonomura et al. |

FOREIGN PATENT DOCUMENTS

| | | | |
|---|---|---|---|
| DE | 199 50 053 A1 | 4/2001 | |
| JP | 60-037455 A | 2/1985 | |
| JP | 62-181928 A | 8/1987 | |
| JP | 63-125446 A | 5/1988 | |
| JP | 04-307165 A | 10/1992 | |
| JP | 05-079554 A | 3/1993 | |
| JP | 8-178043 A | 7/1996 | |
| JP | 11-51162 A | 2/1999 | |
| JP | 11-108175 A | 4/1999 | |
| JP | 2002-106700 A | 4/2002 | |
| JP | 2006-112536 A | 4/2006 | |
| JP | 2006-266320 A | 10/2006 | |
| JP | 2007-092665 A | 4/2007 | |
| JP | 2007-118727 A | 5/2007 | |

OTHER PUBLICATIONS

U.S. Appl. No. 12/727,506, filed Mar. 19, 2010, Jozaki et al.
U.S. Appl. No. 12/727,516, filed Mar. 19, 2010, Jozaki et at.
U.S. Appl. No. 12/828,604, filed Jun. 1, 2010, Nonomura.
R. Nonmura, U.S. PTO Notice of Allowance, U.S. Appl. No. 12/828,604, dated Feb. 13, 2012, 17 pages.
T. Jozaki, U.S. PTO Office Action, U.S. Appl. No. 12/727,516, dated Jan. 20, 2012, 10 pages.
R. Nonomura, U.S. PTO Notice of Allowance, U.S. Appl. No. 12/828,604, dated Jun. 7, 2012, 12 pages.
T. Jozaki, U.S. PTO Notice of Allowance, U.S. Appl. No. 12/727,516, dated Apr. 26, 2012, 6 pages.
T. Jozaki, U.S. PTO Notice of Allowance, U.S. Appl. No. 12/727,497, dated Aug. 1, 2012, 16 pages.

* cited by examiner

A # CONTINUOUSLY VARIABLE TRANSMISSION AND CONTROL METHOD THEREOF

TECHNICAL FIELD OF THE INVENTION

This invention relates to a continuously variable transmission and a control method thereof, and more particularly to a continuously variable transmission comprising a belt continuously variable speed change mechanism and a subtransmission mechanism.

BACKGROUND OF THE INVENTION

JP60-37455A discloses a continuously variable transmission in which a two-forward speed subtransmission mechanism is provided in series with a belt continuously variable speed change mechanism (to be referred to hereafter as a "variator"), and a gear position of the subtransmission mechanism is changed in accordance with an operating condition of a vehicle. Thus, an achievable speed ratio range is enlarged without increasing the size of the variator.

JP5-79554A discloses a technique employed in this type of continuously variable transmission including a subtransmission mechanism for maintaining an overall speed ratio (to be referred to hereafter as a "through speed ratio") of the continuously variable transmission at a constant value by performing a coordinated shift to vary the speed ratio of the variator in coordination with gear position change performed on the subtransmission mechanism. By maintaining the through speed ratio at a constant value on either side of the coordinated shift, speed variation in an engine and a torque converter during a shift in the subtransmission mechanism is suppressed, thereby preventing shift shock caused by inertia torque from the engine and torque converter.

SUMMARY OF THE INVENTION

A shift speed of the variator is lower than a shift speed of the subtransmission mechanism, and therefore the time required to perform the coordinated shift is dependent on the shift speed of the variator. Hence, when the variator is shifted in order to maintain the through speed ratio at a constant value during a coordinated shift, the freedom to set the time required to perform the coordinated shift is low, making it difficult to respond to different shift response requirements in accordance with different operating conditions.

It is therefore an object of this invention to increase the freedom to set a time required to perform a coordinated shift, thereby making it possible to respond to difference shift response requirements in accordance with different operating conditions.

According to an aspect of the present invention, a continuously variable transmission installed in a vehicle, which shifts an output rotation of a power source and transmits the shifted rotation to drive wheels, includes a belt type continuously variable speed change mechanism (to be referred to hereafter as a "variator") capable of varying a speed ratio continuously, a subtransmission mechanism provided in series with the variator and having a first gear position and a second gear position, the second gear position having a smaller speed ratio than the first gear position, as forward gear positions, a destination through speed ratio setting unit which sets, on the basis of an operating condition of the vehicle, an overall speed ratio (to be referred to hereafter as a "through speed ratio") of the variator and the subtransmission mechanism to be realized in accordance with the operating condition as a destination through speed ratio, a shift control unit which controls at least one of the speed ratio of the variator and the gear position of the subtransmission mechanism such that an actual value of the through speed ratio (to be referred to hereafter as an "actual through speed ratio") becomes the destination through speed ratio, a coordinated shifting unit which changes the gear position of the subtransmission mechanism and varying the speed ratio of the variator in an opposite direction to a speed ratio variation direction of the subtransmission mechanism when the actual through speed ratio passes a predetermined mode switch line, a shift response improvement requirement determining unit which determines, on the basis of the operating condition of the vehicle, whether or not an improvement in a shift response of the continuously variable transmission is required; and a shift speed varying unit which increases a shift speed of the subtransmission mechanism compared with a normal coordinated shift when the improvement in the shift response of the continuously variable transmission is determined to be required and the actual through speed ratio passes the mode switch line from a Low side to a High side. The normal coordinated shift is a coordinated shift which is performed when the improvement in the shift response of the continuously variable transmission is not determined to be required and the actual through speed ratio passes the mode switch line.

According to another aspect of the present invention, a control method for a continuously variable transmission installed in a vehicle so as to shift an output rotation of a power source and transmit the shifted rotation to drive wheels, including a belt type continuously variable speed change mechanism (to be referred to hereafter as a "variator") capable of varying a speed ratio continuously, and a subtransmission mechanism provided in series with the variator and having a first gear position and a second gear position, the second gear position having a smaller speed ratio than the first gear position, as forward gear positions, is provided. The method includes a destination through speed ratio setting step for setting, on the basis of an operating condition of the vehicle, an overall speed ratio (to be referred to hereafter as a "through speed ratio") of the variator and the subtransmission mechanism to be realized in accordance with the operating condition as a destination through speed ratio, a shift control step for controlling at least one of the speed ratio of the variator and the gear position of the subtransmission mechanism such that an actual value of the through speed ratio (to be referred to hereafter as an "actual through speed ratio") becomes the destination through speed ratio, a coordinated shifting step for changing the gear position of the subtransmission mechanism and varying the speed ratio of the variator in an opposite direction to a speed ratio variation direction of the subtransmission mechanism when the actual through speed ratio passes a predetermined mode switch line, a shift response improvement requirement determining step for determining, on the basis of the operating condition of the vehicle, whether or not an improvement in a shift response of the continuously variable transmission is required, and a shift speed varying step for increasing a shift speed of the subtransmission mechanism compared with a normal coordinated shift when the improvement in the shift response of the continuously variable transmission is determined to be required and the actual through speed ratio passes the mode switch line from a Low side to a High side, the normal coordinated shift being a coordinated shift which is performed when the improvement in the shift response of the continuously variable transmission is not determined to be required and the actual through speed ratio passes the mode switch line.

Embodiments and advantages of this invention will be described in detail below with reference to the attached figures.

DESCRIPTION OF THE PREFERRED EMBODIMENTS

An embodiment of this invention will be described below with reference to the attached figures. It should be noted that in the following description, a "speed ratio" of a certain speed change mechanism is a value obtained by dividing an input rotation speed of the speed change mechanism by an output rotation speed of the speed change mechanism. Further, a "Lowest speed ratio" is a maximum speed ratio of the speed change mechanism and a "Highest speed ratio" is a minimum speed ratio of the speed change mechanism.

Figure 1:
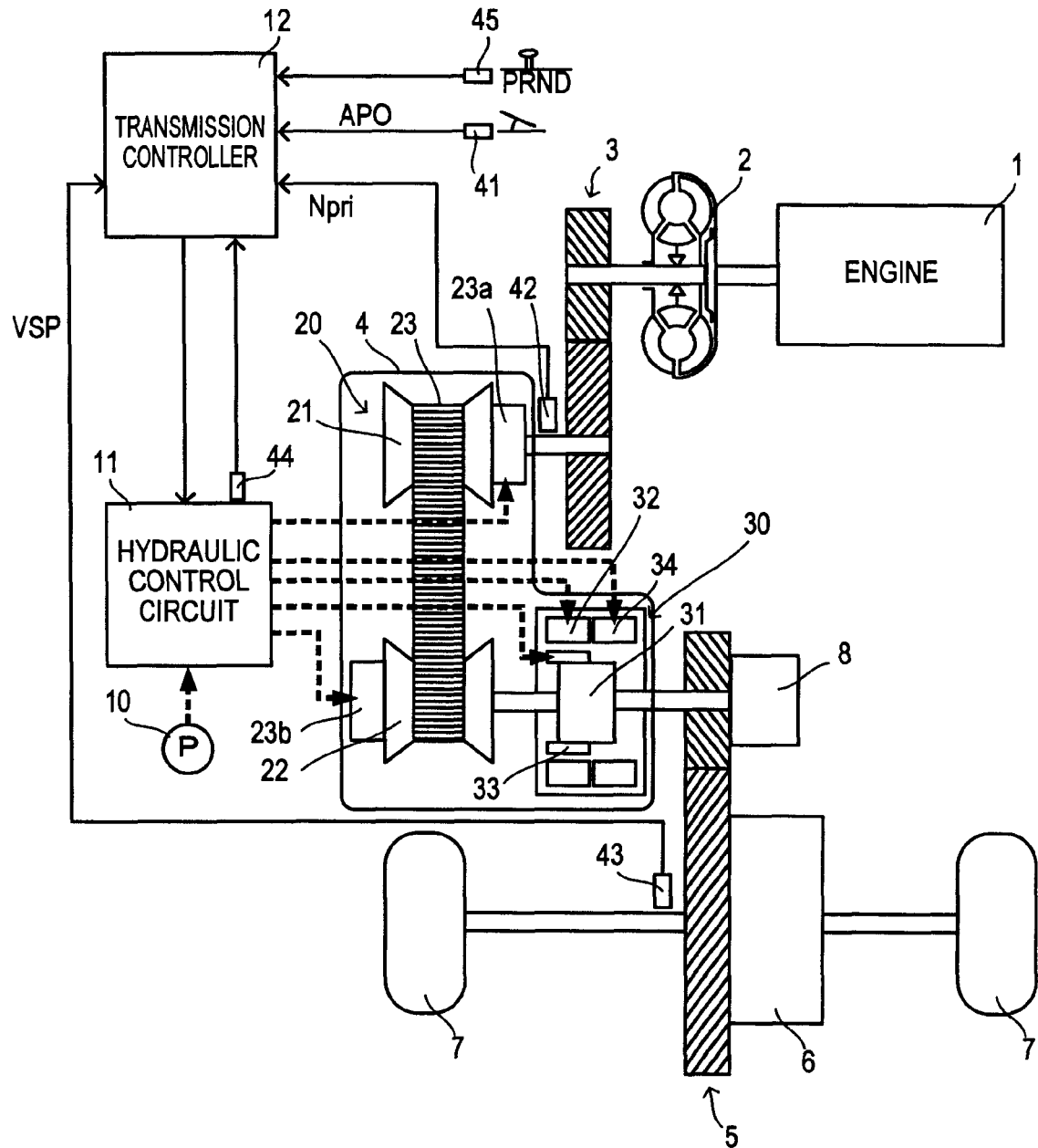
FIG. 1 is a schematic diagram showing a vehicle installed with a continuously variable transmission according to an embodiment of this invention.

FIG. 1 is a schematic diagram showing a vehicle installed with a continuously variable transmission according to an embodiment of this invention. The vehicle includes an engine 1 as a power source. An output rotation of the engine 1 is transmitted to drive wheels 7 via a torque converter 2 including a lockup clutch, a first gear train 3, a continuously variable transmission (to be referred to simply as a "transmission 4" hereafter), a second gear train 5, and a final reduction gear 6. The second gear train 5 is provided with a parking mechanism 8 which locks an output shaft of the transmission 4 mechanically during parking so that the output shaft of the transmission 4 cannot rotate.

Further, the vehicle is provided with an oil pump 10 that is driven using a part of the power of the engine 1, a hydraulic control circuit 11 that regulates an oil pressure from the oil pump 10 and supplies the regulated oil pressure to respective sites of the transmission 4, and a transmission controller 12 that controls the hydraulic control circuit 11.

The transmission 4 includes a belt continuously variable speed change mechanism (to be referred to hereafter as a "variator") 20, and a subtransmission mechanism 30 provided in series with the variator 20. Here, "provided in series" means that the variator 20 and the subtransmission mechanism 30 are provided in series on a power transmission path extending from the engine 1 to the drive wheels 7. The subtransmission mechanism 30 may be connected to an output shaft of the variator 20 directly, as in this example, or via another speed change/power transmission mechanism (a gear train, for example). Alternatively, the subtransmission mechanism 30 may be connected to a front stage (an input shaft side) of the variator 20.

The variator 20 includes a primary pulley 21, a secondary pulley 22, and a V belt 23 wrapped around the pulleys 21, 22. The pulleys 21, 22 respectively include a fixed conical plate, a movable conical plate disposed relative to the fixed conical plate such that respective sheave surfaces thereof oppose each other, thereby forming a V groove, and hydraulic cylinders 23a, 23b provided on a back surface of the movable conical plate so as to displace the movable conical plate in an axial direction. When oil pressure supplied to the hydraulic cylinders 23a, 23b is regulated, a width of the V groove varies, causing a contact radius between the V belt 23 and the respective pulleys 21, 22 to vary, and as a result, the speed ratio of the variator 20 is varied continuously.

The subtransmission mechanism 30 is a speed change mechanism having two-forward speed and single-reverse speed. The subtransmission mechanism 30 includes a Ravigneaux planetary gear mechanism 31 in which carriers of two planetary gears are coupled, and a plurality of frictional engagement elements (a Low brake 32, a High clutch 33, and a Rev brake 34) which are connected to a plurality of rotary elements constituting the Ravigneaux planetary gear mechanism 31 so as to modify rotation states thereof. When engagement/disengagement states of the respective frictional engagement elements 32 to 34 are modified by regulating oil pressures supplied to the respective frictional engagement elements 32 to 34, the gear position of the subtransmission mechanism 30 is changed.

For example, when the Low brake 32 is engaged and the High clutch 33 and Rev brake 34 are disengaged, the gear position of the subtransmission mechanism 30 becomes a first speed. When the High clutch 33 is engaged and the Low brake 32 and Rev brake 34 are disengaged, the gear position of the subtransmission mechanism 30 becomes a second speed in which the speed ratio is smaller than that of the first speed. Further, when the Rev brake 34 is engaged and the Low brake 32 and High clutch 33 are disengaged, the gear position of the subtransmission mechanism 30 becomes the reverse speed. In the following description, the terms "the transmission 4 is in a low speed mode" and "the transmission 4 is in a high speed mode" will be used to indicate that the gear position of the subtransmission mechanism 30 corresponds to the first speed and the second speed, respectively.

Figure 2:
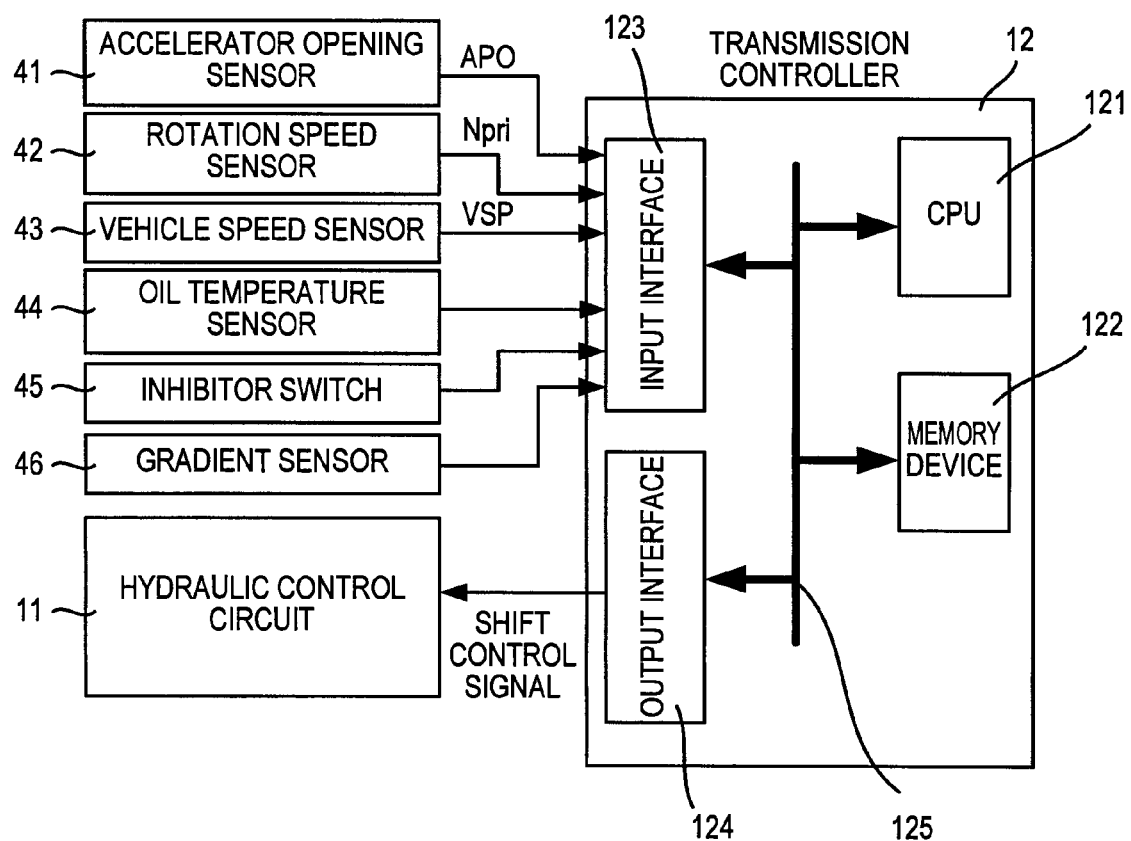
FIG. 2 is a view showing an internal constitution of a transmission controller.

As shown in FIG. 2, the transmission controller 12 is constituted by a CPU 121, a memory device 122 including a RAM and a ROM, an input interface 123, an output interface 124, and a bus 125 that connects these components to each other.

An output signal from an accelerator opening sensor 41 that detects an accelerator opening APO, which is an operating amount of an accelerator pedal, an output signal from a rotation speed sensor 42 that detects an input rotation speed of the transmission 4 (=a rotation speed of the primary pulley 21; to be referred to hereafter as a "primary rotation speed Npri"), an output signal from a vehicle speed sensor 43 that detects a vehicle speed VSP, an output signal from an oil temperature sensor 44 that detects an oil temperature TMP of the transmission 4, an output signal from an inhibitor switch 45 that detects a position of a select lever, an output signal from a gradient sensor 46 that detects a gradient of a road surface along which the vehicle is currently traveling, and so on are input into the input interface 123.

The memory device 122 stores a shift control program (FIG. 4) of the transmission 4, and a shift map (FIG. 3) used by the shift control program. The CPU 121 reads and executes the shift control program stored in the memory device 122, generates a shift control signal by implementing various types of calculation processing on the various signals input via the input interface 123, and outputs the generated shift control signal to the hydraulic control circuit 11 via the output interface 124. Various values used during the calculation processing executed by the CPU 121 and results of the calculation processing are stored in the memory device 122 as appropriate.

The hydraulic control circuit 11 is constituted by a plurality of flow passages and a plurality of hydraulic control valves. The hydraulic control circuit 11 controls the plurality of hydraulic control valves on the basis of the shift control signal from the transmission controller 12 to switch an oil pressure supply path, regulate the oil pressure generated by the oil pump 10 to a required oil pressure, and supply the regulated oil pressure to the respective sites of the transmission 4. Thus, the speed ratio of the variator 20 and the gear position of the subtransmission mechanism 30 are changed, whereby a shift is performed in the transmission 4.

Figure 3:
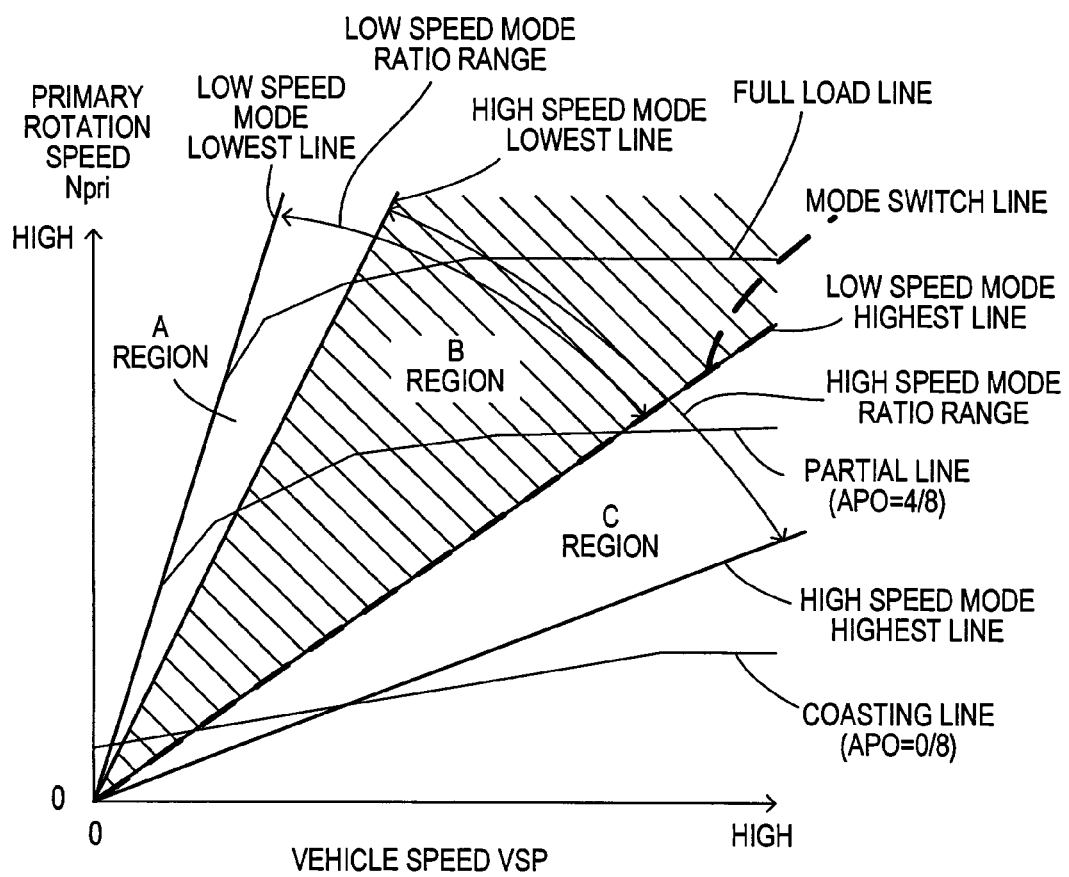
FIG. 3 is a view showing an example of a shift map.

FIG. 3 shows an example of the shift map stored in the memory device 122. The transmission controller 12 controls the variator 20 and the subtransmission mechanism 30 in accordance with operating conditions of the vehicle (in this embodiment, the vehicle speed VSP, the primary rotation speed Npri, and the accelerator opening APO) while referring to the shift map.

On the shift map, operating points of the transmission 4 are defined by the vehicle speed VSP and the primary rotation speed Npri. An incline of a line linking the operating point of the transmission 4 and a zero point in a lower left corner of the shift map corresponds to the speed ratio of the transmission 4 (an overall speed ratio obtained by multiplying the speed ratio of the subtransmission mechanism 30 by the speed ratio of the variator 20; to be referred to hereafter as a "through speed ratio"). On this shift map, similarly to a shift map of a conventional belt continuously variable transmission, a shift line is set for each accelerator opening APO, and a shift is performed in the transmission 4 in accordance with a shift line selected according to the accelerator opening APO. For the sake of simplicity, FIG. 3 shows only a full load line (a shift line when the accelerator opening APO=8/8), a partial line (a shift line when the accelerator opening APO=4/8), and a coasting line (a shift line when the accelerator opening APO=0/8).

When the transmission 4 is in the low speed mode, the transmission 4 can be shifted between a low speed mode Lowest line obtained by setting the speed ratio of the variator 20 at the Lowest speed ratio and a low speed mode Highest line obtained by setting the speed ratio of the variator 20 at the Highest speed ratio. Namely, in the low speed mode, the operating point of the transmission 4 moves within an A region and a B region in the figure. When the transmission 4 is in the high speed mode, on the other hand, the transmission 4 can be shifted between a high speed mode Lowest line obtained by setting the speed ratio of the variator 20 at the Lowest speed ratio and a high speed mode Highest line obtained by setting the speed ratio of the variator 20 at the Highest speed ratio. Namely, in the high speed mode, the operating point of the transmission 4 moves within the B region and a C region in the figure.

The speed ratio in each gear position of the subtransmission mechanism 30 is set such that the speed ratio corresponding to the low speed mode Highest line (the low speed mode Highest speed ratio) is smaller than the speed ratio corresponding to the high speed mode Lowest line (the high speed mode Lowest speed ratio). In so doing, a through speed ratio range of the transmission 4 that can be realized in the low speed mode (referred to as a "low speed mode ratio range" in the figure) partially overlaps a through speed ratio range of the transmission 4 that can be realized in the high speed mode (referred to as a "high speed mode ratio range" in the figure), and therefore, when the operating point of the transmission 4 is in the B region sandwiched between the high speed mode Lowest line and the low speed mode Highest line, the transmission 4 can select either the low speed mode or the high speed mode.

Furthermore, a mode switch line at which the subtransmission mechanism 30 performs a shift is set on the shift map to overlap the low speed mode Highest line. The through speed ratio corresponding to the mode switch line (to be referred to hereafter as a "mode switch speed ratio mRatio") is set at an equal value to the low speed mode Highest speed ratio. The reason for setting the mode switch line in this manner is because an input torque input into the subtransmission mechanism 30 decreases as the speed ratio of the variator 20 decreases and thus shift shock during a shift in the subtransmission mechanism 30 can be suppressed.

When the operating point of the transmission 4 crosses the mode switch line, or in other words when an actual value of the through speed ratio (to be referred to hereafter as an "actual through speed ratio Ratio") passes the mode switch shift ratio mRatio, the transmission controller 12 performs a coordinated shift to be described below in order to switch between the high speed mode and the low speed mode. Hereinafter, "the operation point of the transmission 4 crosses the mode switch line" is expressed as "the through speed ratio of the transmission 4 passes the mode switch line".

In the coordinated shift, the transmission controller 12 performs a shift in the subtransmission mechanism 30 and varies the speed ratio of the variator 20 in an opposite direction to a variation direction of the speed ratio of the subtransmission mechanism 30. At this time, an inertia phase in which the speed ratio of the subtransmission mechanism 30 actually varies is synchronized with a period in which the speed ratio of the variator 20 varies. The speed ratio of the variator 20 is varied in the opposite direction to the speed ratio variation direction of the subtransmission mechanism 30 to ensure that a driver does not experience an unpleasant feeling due to input rotation variation caused by a step in the actual through speed ratio Ratio.

More specifically, when the actual through speed ratio Ratio of the transmission 4 passes the mode switch line (the mode switch speed ratio mRatio) from the Low side to the High side, the transmission controller 12 changes the gear position of the subtransmission mechanism 30 from the first speed to the second speed (a 1-2 shift) and varies the speed ratio of the variator 20 to the Low side.

Conversely, when the actual through speed ratio Ratio of the transmission 4 passes the mode switch line (the mode switch speed ratio mRatio) from the High side to the Low side, the transmission controller 12 changes the gear position of the subtransmission mechanism 30 from the second speed to the first speed (a 2-1 shift) and varies the speed ratio of the variator 20 to the High side.

The variator 20 has a lower shift speed than the subtransmission mechanism 30, and therefore the time required to perform the coordinated shift is dependent on the shift speed of the variator 20. Hence, when the variator 20 is shifted in order to maintain the actual through speed ratio Ratio at a constant value during a coordinated shift, the freedom to set the time required to perform the coordinated shift is low, making it difficult to respond to different shift response requirements in accordance with different operating conditions.

Therefore, in a situation where a high-level shift response is required, the transmission controller 12 reduces an amount by which the speed ratio of the variator 20 is varied and increases the shift speed of the subtransmission 30 during the coordinated shift, thereby reducing the time required for the coordinated shift and improving the shift responsiveness.

Figure 4A:
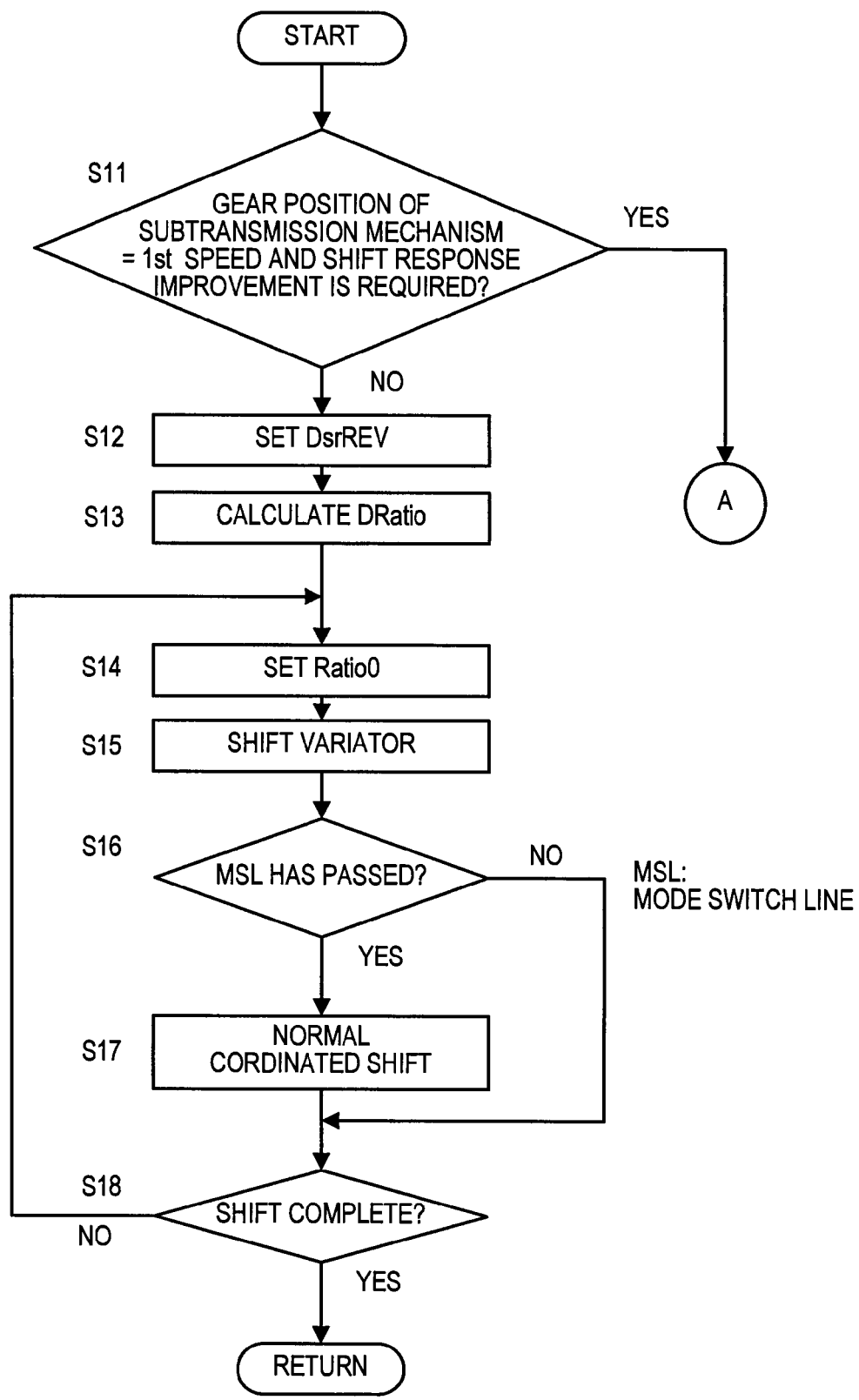
FIGS. 4A and 4B are flowcharts showing the content of a shift control program executed by the transmission controller.
Figure 4B:
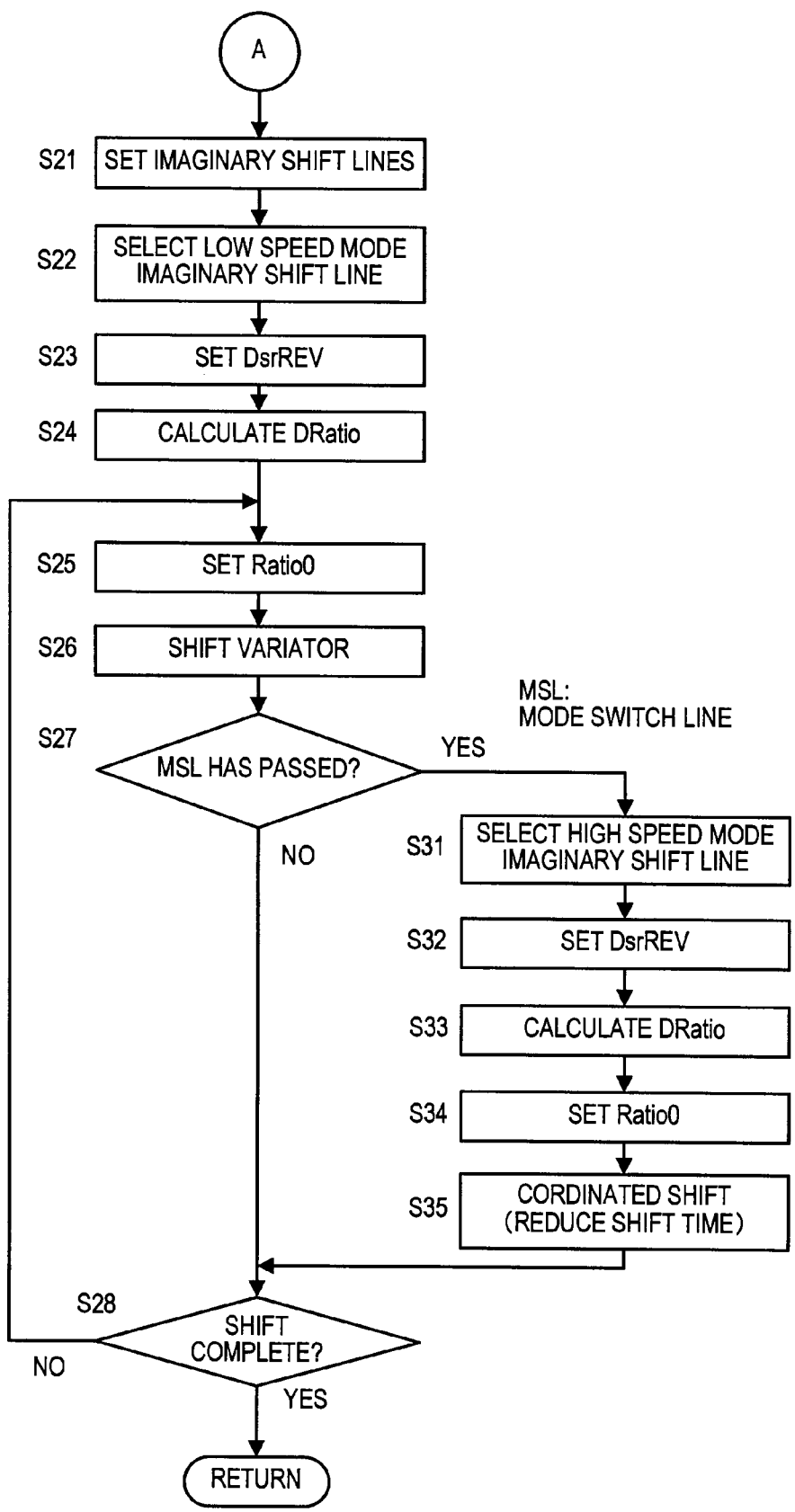

FIGS. 4A and 4B show examples of the shift control program stored in the memory device 122 of the transmission controller 12. The specific content of the shift control executed by the transmission controller 12 will now be described with reference to FIGS. 4A and 4B.

In S11, the transmission controller 12 determines, on the basis of the operating conditions of the vehicle, whether or not the gear position of the subtransmission mechanism 30 corresponds to the first speed and an improvement in the shift response of the transmission 4 is required. The transmission controller 12 determines that an improvement in the shift response of the transmission 4 is required when at least one of the following conditions (1) to (3) is established.

(1) The accelerator opening APO is greater than a predetermined large opening (for example, APO=6/8), indicating that the vehicle is accelerating.

(2) The gradient of the road surface on which the vehicle is currently traveling is greater than a predetermined large gradient (5%, for example), indicating that the vehicle is traveling uphill.

(3) The oil temperature TMP of the transmission 4 is higher than a predetermined high temperature (80° C., for example) or the temperature of the frictional engagement elements 32 to 34 constituting the subtransmission mechanism 30 is higher than an allowable upper limit temperature (for example, a predetermined high temperature having a margin relative to a heat deterioration temperature), indicating the need to suppress heat generation in the frictional engagement elements 32 to 34.

The conditions for determining that an improvement in the shift response of the transmission 4 is required are not limited to the conditions described here, and other conditions (for example, whether the vehicle is traveling in a sport mode or a manual mode) may be added.

When it is determined that the gear position of the subtransmission mechanism 30 corresponds to the first speed and an improvement in the shift response of the transmission 4 is required, the processing advances to S22 in FIG. 4B, and when a negative determination is made, the processing advances to S12.

In S12, the transmission controller 12 searches the shift map shown in FIG. 3 for a value corresponding to the current vehicle speed VSP and accelerator opening APO, and sets this value as a destination primary rotation speed DsrREV. The destination primary rotation speed DsrREV is a primary rotation speed to be reached at the current vehicle speed VSP and accelerator opening APO, and serves as a steady-state target value of the primary rotation speed.

In S13, the transmission controller 12 calculates a destination through speed ratio DRatio by dividing the destination primary rotation speed DsrREV by the vehicle speed VSP and a final reduction ratio fRatio of the final reduction gear 6. The destination through speed ratio DRatio is a through speed ratio to be reached at the current vehicle speed VSP and accelerator opening APO, and serves as a steady-state target value of the through speed ratio.

In S14, the transmission controller 12 sets a target through speed ratio Ratio0 for varying the actual through speed ratio Ratio from the value thereof at the start of the shift to the destination through speed ratio DRatio at a predetermined transient response. The target through speed ratio Ratio0 is a transient target value of the through speed ratio. The predetermined transient response is a first order lag response, for example, which is set such that the target through speed ratio Ratio0 gradually approaches the destination through speed ratio DRatio. The actual through speed ratio Ratio is calculated whenever required on the basis of the current vehicle speed VSP and primary rotation speed Npri (likewise hereafter).

In S15, the transmission controller 12 controls the actual through speed ratio Ratio to the target through speed ratio Ratio0. More specifically, the transmission controller 12 calculates a target speed ratio vRatio0 of the variator 20 by dividing the target through speed ratio Ratio0 by the speed ratio of the subtransmission mechanism 30, and controls the variator 20 such that an actual speed ratio vRatio of the variator 20 becomes the target speed ratio vRatio0. As a result, the actual through speed ratio Ratio follows the destination through speed ratio DRatio at the predetermined transient response.

In S16, the transmission controller 12 determines whether or not the actual through speed ratio Ratio has passed the mode switch line, namely it passed the mode switch speed ratio mRatio. When an affirmative determination is made, the processing advances to S17, and when a negative determination is made, the processing advances to S18.

In S17, the transmission controller 12 executes a normal coordinated shift. The normal coordinated shift is a coordinated shift which is performed when an improvement in the shift response is not required. In the normal coordinated shift, the transmission controller 12 performs a shift in the subtransmission mechanism 30 (when the current gear position is the first speed, a 1-2 shift and when the current gear position is the second speed, a 2-1 shift), and varies the actual speed ratio vRatio of the variator 20 in the opposite direction to the speed ratio variation direction of the subtransmission mechanism 30 while the shift speed of the subtransmission mechanism 30 is reduced in accordance with the low shift speed of the variator 20 to achieve the target through ratio DRatio0 during the coordinated shift. Thus, a step does not occur in the actual through speed ratio Ratio on either side of the coordinated shift.

In S18, the transmission controller 12 determines whether or not the shift is complete in the transmission 4. More specifically, the transmission controller 12 determines that the shift is complete when a deviation between the actual through speed ratio Ratio and the destination through speed ratio DRatio is smaller than a predetermined value. When it is determined that the shift is complete, the processing is terminated, and when it is determined that the shift is not complete, the processing of S14 to S18 is repeated until it is determined that the shift is complete.

Figure 5:
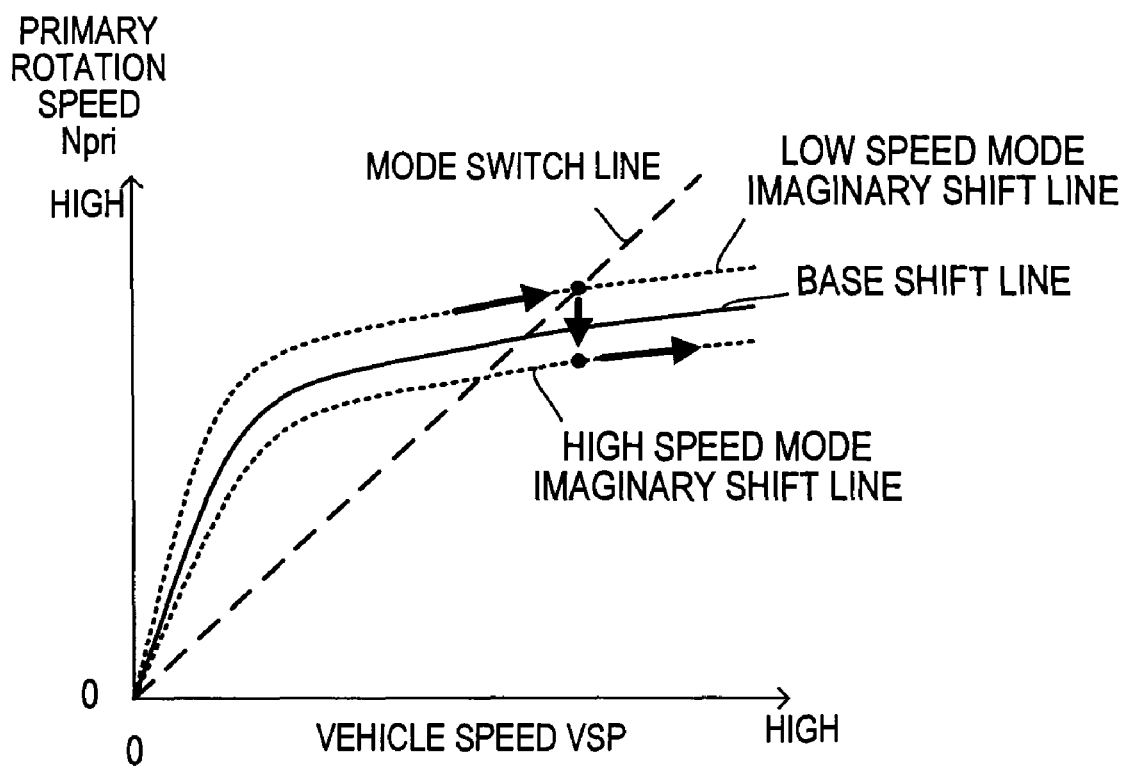
FIG. 5 is a view illustrating a shift operation according to an embodiment of this invention.

Meanwhile, when the processing advances from S11 to S21 in FIG. 4B (i.e. when the gear position of the subtransmission mechanism 30=the first speed and a high-level shift response is required), the transmission controller 12 sets a low speed mode imaginary shift line and a high speed mode imaginary shift line. As shown in FIG. 5, the low speed mode imaginary shift line and high speed mode imaginary shift line are set respectively on the Low side and the High side of a shift line (a base shift line) corresponding to the current accelerator opening APO. The respective deviations of the low speed mode imaginary shift line and high speed mode imaginary shift line from the base shift line are set within a range for ensuring that rotation speed variation in the engine 1 caused by a step occurring in the actual through speed ratio Ratio when a coordinated shift having a reduced shift time, to be described below, is performed remains at an allowable level.

In S22, the transmission controller 12 selects the low speed mode imaginary shift line as the shift line.

In S23, the transmission controller 12 sets the destination primary rotation speed DsrREV on the basis of the low speed mode imaginary shift line and the current vehicle speed VSP.

In S24 to S28, similarly to S13 to S18, the transmission controller 12 sets the destination through speed ratio DRatio and the target through speed ratio Ratio0, and repeats the processing for controlling the actual through speed ratio Ratio to the target through speed ratio Ratio0. When it is determined in this period that the actual through speed ratio Ratio has passed the mode switch line, namely it has passed the mode switch shift ratio mRatio, the processing advances to S31.

In S31, the transmission controller 12 selects the high speed mode imaginary shift line as the shift line (shift line switching).

In S32 to S34, the transmission controller 12 resets the destination primary rotation speed DsrREV on the basis of the high speed mode imaginary shift line and the current vehicle speed VSP, and then recalculates the destination through speed ratio DRatio and resets the target through speed ratio Ratio0 on the basis thereof.

In S35, the transmission controller 12 executes a coordinated shift having a reduced shift time. In the coordinated shift executed in S35, the transmission controller 12 performs a 1-2 shift in the subtransmission mechanism 30 and varies the actual speed ratio vRatio of the variator 20 in the opposite direction to the speed ratio variation direction of the subtransmission mechanism 30 such that the actual through speed ratio Ratio reaches the target through speed ratio Ratio0 reset in S34.

When the shift line is modified from the low speed mode imaginary shift line to the high speed mode imaginary shift line in S31, the destination through speed ratio DRatio and the target through speed ratio Ratio0 calculated on the basis thereof are modified to the High side. In so doing, the amount by which the speed ratio of the variator 20 varies during the coordinated shift executed in S35 decreases. Further, in accordance with this decrease, the shift speed of the subtransmission mechanism 30 is increased compared with the normal coordinated shift. As a result, the time required for the coordinated shift becomes shorter than the time required for the normal coordinated shift executed in S17.

Once the coordinated shift is complete, the processing advances to S28, in which the transmission controller 12 determines whether or not the shift is complete in the transmission 4. When the shift is complete, the processing is terminated. When the shift is not complete, the processing returns to S25, whereupon the processing of S25 to S28 is repeated until the shift in the transmission 4 is complete.

Next, actions and effect obtained by the above shift control will be described.

According to the shift control described above, when the actual through speed ratio Ratio passes the mode switch line (the mode switch speed ratio mRatio), a coordinated shift is executed to change the gear position of the subtransmission mechanism 30 and vary the speed ratio of the variator 20 in the opposite direction to the speed ratio variation direction of the subtransmission mechanism 30. If, at this time, the actual through speed ratio Ratio passes the mode switch line from the Low side to the High side, the destination through speed ratio DRatio is modified to the High side.

FIG. 5 uses arrows to show the manner in which the destination through speed ratio DRatio set in accordance with the shift line is modified to the High side when the shift line is switched from the low speed mode imaginary shift line to the high speed mode imaginary shift line. When the shift line is modified such that the destination through speed ratio DRatio is modified to the High side, the speed ratio to be achieved by the variator 20 following the coordinated shift is modified to the High side, leading to a reduction in the amount by which the speed ratio of the variator 20 varies during the coordinated shift (in this coordinated shift, the variator 20 is shifted to the Low side). When the speed ratio variation amount of the variator 20 decreases, the time required to shift the variator 20 decreases, leading to a reduction in the time required to perform the coordinated shift.

Figure 6:
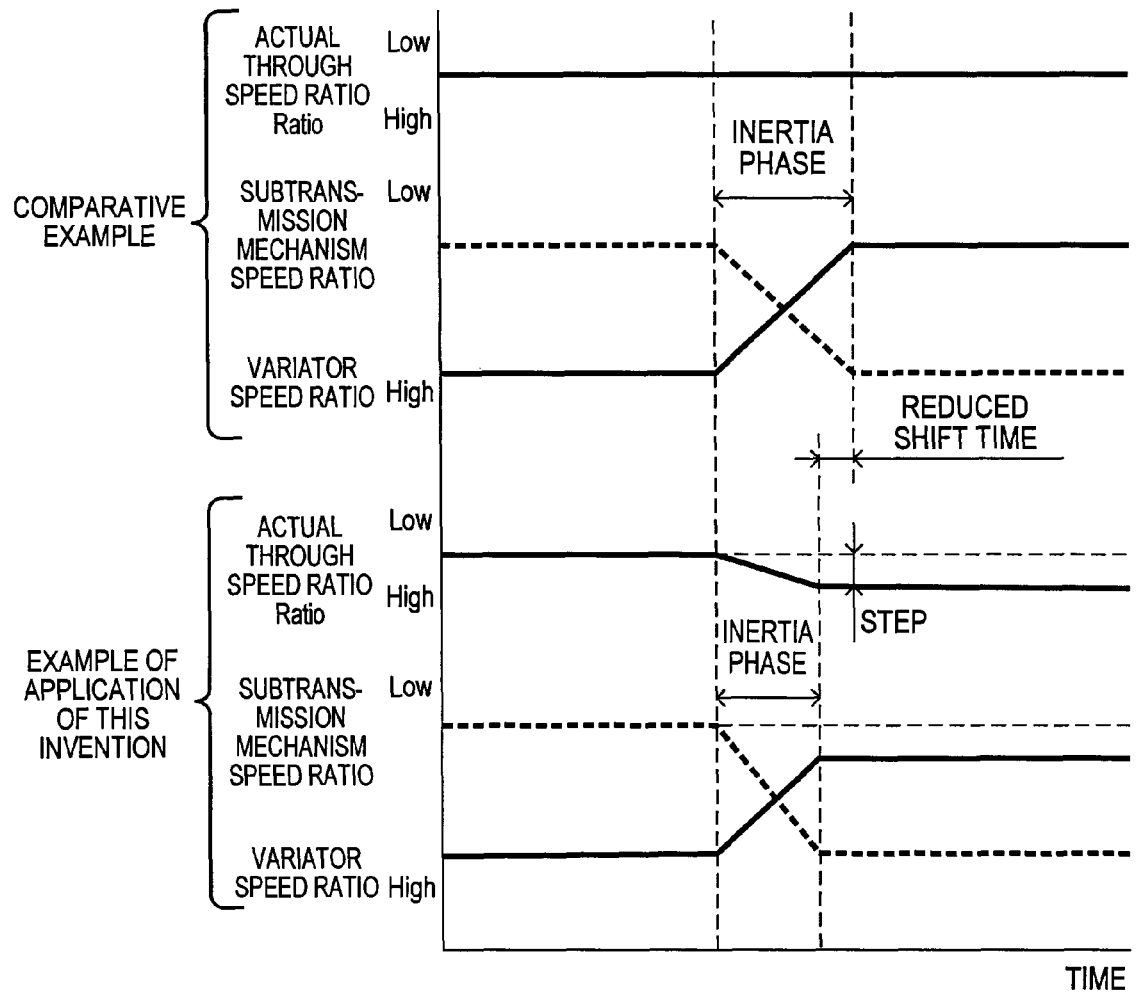
FIG. 6 is a timing chart for explaining actions and effects of the embodiment of this invention.

FIG. 6 is a view comparing a normal coordinated shift (a comparative example) and a coordinated shift having a reduced shift time (an example of application of this invention). In both cases, the speed ratio of the variator 20 is varied after being synchronized with the inertia phase of the subtransmission mechanism 30 in the coordinated shift, but in the application example of this invention, the time required for the coordinated shift is shorter than that of the comparative example because the shift speed of the subtransmission mechanism 30 is increased compared with the normal coordinated shift and the speed ratio variation amount of the variator 20 is reduced.

Hence, according to the shift control described above, when the actual through speed ratio Ratio passes the mode switch line (the mode switch speed ratio mRatio) from the Low side to the High side, the time required for the coordinated shift is reduced, and as a result, shift responsiveness during an upshift, which requires greater shift responsiveness than a downshift, can be increased.

Moreover, during a mode switch, a step occurs in the actual through speed ratio Ratio, making the driver aware that a shift has been performed in the subtransmission mechanism 30. Furthermore, when the time required for the coordinated shift is reduced, slippage in the frictional engagement elements 32 to 34 of the subtransmission mechanism 30 during the coordinated shift decreases, and as a result, the life of the frictional engagement elements 32 to 34 can be extended.

The time required to perform a coordinated shift is reduced only when an improvement in the shift response of the transmission 4 is required. In so doing, the frequency with which the driver experiences an unpleasant feeling due to rotation speed variation in the engine 1 caused by the step in the actual through speed ratio Ratio before and after the coordinated shift can be reduced.

Examples of operating conditions in which an improvement in the shift response of the transmission 4 is required include acceleration, uphill travel, and a high oil temperature TMP in the transmission 4 or a high temperature in the frictional engagement elements 32 to 34.

By reducing the time required to perform a coordinated shift during acceleration or uphill travel such that the shift time of the transmission 4 decreases, a desired acceleration performance and a desired climbing performance can be realized.

Further, by reducing the time required to perform a coordinated shift when the oil temperature TMP of the transmission 4 or the temperature of the frictional engagement elements 32 to 34 is high such that the shift time of the transmission 4 decreases, the amount of heat generated by the frictional engagement elements 32 to 34 constituting the subtransmission mechanism 30 due to slippage can be suppressed, leading to a reduction in the oil temperature TMP or the temperature of the frictional engagement elements 32 to 34. The temperature of the frictional engagement elements 32 to 34 may be estimated on the basis of an engagement/disengagement history.

An embodiment of this invention was described above, but this embodiment is merely one example of application of this invention, and the technical scope of this invention is not limited to the specific constitutions of the embodiment.

For example, in the above embodiment, the mode switch line is set to overlap the low speed mode Highest line, but the mode switch line may be set to overlap the high speed mode Lowest line or set between the high speed mode Lowest line and the low speed mode Highest line. The mode switch line may be comprised of polygonal line similar to a shift line for a conventional step automatic transmission.

Further, in the above embodiment, the subtransmission mechanism 30 is a speed change mechanism having the first speed and second speed gear positions as forward gear positions, but the subtransmission mechanism 30 may be a speed change mechanism having three or more gear positions as forward gear positions.

Furthermore, the subtransmission mechanism 30 is formed using a Ravigneaux planetary gear mechanism, but is not limited to this constitution. For example, the subtransmission mechanism 30 may be constituted by a combination of a normal planetary gear mechanism and frictional engagement elements, or by a plurality of power transmission paths formed from a plurality of gear trains having different speed ratios, and frictional engagement elements for switching the power transmission paths.

Further, the V belt 23 may be comprised of a metal ring and a plurality of metal elements, but the V belt 23 may be comprised of an endless chain. The term "belt" in claims covers various types of belt which can be used for transmitting rotation between pulleys in a continuously variable transmission.

Further, the hydraulic cylinders 23a, 23b are provided as actuators for displacing the movable conical plates of the pulleys 21, 22 in the axial direction, but the actuators may be driven electrically rather than hydraulically.

Further, in the above embodiment, the power source is comprised of the engine 1, but an electric motor or a combination of an engine and an electric motor may be used as the power source.

This application claims priority based on Japanese Patent Application No. 2009-79676, filed with the Japan Patent Office on Mar. 27, 2009, the entire content of which is incorporated into this specification.

What is claimed is:

1. A continuously variable transmission installed in a vehicle, which shifts an output rotation of a power source and transmits a shifted rotation to drive wheels, comprising:
   a variator which is a belt type continuously variable speed change mechanism capable of varying a speed ratio continuously;
   a subtransmission mechanism provided in series with the variator and having a first gear position and a second gear position, the second gear position having a smaller speed ratio than the first gear position, as forward gear positions;
   a destination through speed ratio setting unit which sets, on a basis of an operating condition of the vehicle, a through speed ratio which is an overall speed ratio of the variator and the subtransmission mechanism to be realized in accordance with the operating condition as a destination through speed ratio;
   a shift control unit which controls at least one of the speed ratio of the variator and a gear position of the subtransmission mechanism such that an actual through speed ratio which is an actual value of the through speed ratio becomes the destination through speed ratio;
   a coordinated shifting unit which changes the gear position of the subtransmission mechanism and varies the speed ratio of the variator in an opposite direction to a speed ratio variation direction of the subtransmission mechanism when the actual through speed ratio passes a predetermined mode switch line;
   a shift response improvement requirement determining unit which determines, on the basis of the operating condition of the vehicle, whether or not an improvement in a shift response of the continuously variable transmission is required; and
   a shift speed varying unit which increases a shift speed of the subtransmission mechanism compared with a normal coordinated shift when the improvement in the shift response of the continuously variable transmission is determined to be required and the actual through speed ratio passes the predetermined mode switch line from a Low side to a High side, the normal coordinated shift being a coordinated shift which is performed when the improvement in the shift response of the continuously variable transmission is not determined to be required and the actual through speed ratio passes the predetermined mode switch line.

2. The continuously variable transmission as defined in claim 1, wherein the shift speed varying unit modifies the destination through speed ratio to the High side and increases the shift speed of the subtransmission mechanism compared with the normal coordinated shift when the improvement in the shift response of the continuously variable transmission is determined to be required and the actual through speed ratio passes the predetermined mode switch line from the Low side to the High side.

3. The continuously variable transmission as defined in claim 1, wherein the shift response improvement requirement determining unit determines that the improvement in the shift response of the continuously variable transmission is required when an opening of an accelerator pedal of the power source is greater than a predetermined opening.

4. The continuously variable transmission as defined in claim 1, wherein the shift response improvement requirement determining unit determines that the improvement in the shift response of the continuously variable transmission is required when the vehicle is traveling uphill.

5. The continuously variable transmission as defined in claim 1, wherein the shift response improvement requirement determining unit determines that the improvement in the shift response of the continuously variable transmission is required when an oil temperature of the continuously variable transmission or a temperature of a frictional engagement element constituting the subtransmission mechanism is higher than a predetermined temperature.

6. A control method for a continuously variable transmission installed in a vehicle so as to shift an output rotation of a power source and transmit a shifted rotation to drive wheels, including a variator which is a belt type continuously variable speed change mechanism capable of varying a speed ratio continuously, and a subtransmission mechanism in series with the variator and having a first gear position and a second gear position, the second gear position having a smaller speed ratio than the first gear position, as forward gear positions, the method comprising:
   a destination through speed ratio setting step for setting, on a basis of an operating condition of the vehicle, a through speed ratio which is an overall speed ratio of the variator and the subtransmission mechanism to be realized in accordance with the operating condition as a destination through speed ratio;
   a shift control step for controlling at least one of the speed ratio of the variator and a gear position of the subtransmission mechanism such that an actual through speed ratio which is an actual value of the through speed ratio becomes the destination through speed ratio;

a coordinated shifting step for changing the gear position of the subtransmission mechanism and varies the speed ratio of the variator in an opposite direction to a speed ratio variation direction of the subtransmission mechanism when the actual through speed ratio passes a predetermined mode switch line;

a shift response improvement requirement determining step for determining, on the basis of the operating condition of the vehicle, whether or not an improvement in a shift response of the continuously variable transmission is required; and a shift speed varying step for increasing a shift speed of the subtransmission mechanism compared with a normal coordinated shift when the improvement in the shift response of the continuously variable transmission is determined to be required and the actual through speed ratio passes the predetermined mode switch line from a Low side to a High side, the normal coordinated shift being a coordinated shift which is performed when the improvement in the shift response of the continuously variable transmission is not determined to be required and the actual through speed ratio passes the predetermined mode switch line.

7. The continuously variable transmission as defined in claim 6, wherein the shift speed varying step modifies the destination through speed ratio to the High side and increases the shift speed of the subtransmission mechanism compared with the normal coordinated shift when the improvement in the shift response of the continuously variable transmission is determined to be required and the actual through speed ratio passes the predetermined mode switch line from the Low side to the High side.

8. The continuously variable transmission as defined in claim 6, wherein the shift response improvement requirement determining step determines that the improvement in the shift response of the continuously variable transmission is required when an opening of an accelerator pedal of the power source is greater than a predetermined opening.

9. The continuously variable transmission as defined in claim 6, wherein the shift response improvement requirement determining step determines that the improvement in the shift response of the continuously variable transmission is required when the vehicle is traveling uphill.

10. The continuously variable transmission as defined in claim 6, wherein the shift response improvement requirement determining step determines that the improvement in the shift response of the continuously variable transmission is required when an oil temperature of the continuously variable transmission or a temperature of a frictional engagement element constituting the subtransmission mechanism is higher than a predetermined temperature.

11. A continuously variable transmission installed in a vehicle, which shifts an output rotation of a power source and transmits a shifted rotation to drive wheels, comprising:

a variator which is a belt type continuously variable speed change mechanism capable of varying a speed ratio continuously;

a subtransmission mechanism in series with the variator and having a first gear position and a second gear position, the second gear position having a smaller speed ratio than the first gear position, as forward gear positions;

destination through speed ratio setting means for setting, on a basis of an operating condition of the vehicle, a through speed ratio which is an overall speed ratio of the variator and the subtransmission mechanism to be realized in accordance with the operating condition as a destination through speed ratio;

shift control means for controlling at least one of the speed ratio of the variator and a gear position of the subtransmission mechanism such that an actual through speed ratio which is an actual value of the through speed ratio becomes the destination through speed ratio;

coordinated shifting means for changing the gear position of the subtransmission mechanism and varies the speed ratio of the variator in an opposite direction to a speed ratio variation direction of the subtransmission mechanism when the actual through speed ratio passes a predetermined mode switch line;

shift response improvement requirement determining means for determining, on the basis of the operating condition of the vehicle, whether or not an improvement in a shift response of the continuously variable transmission is required; and shift speed varying means for increasing a shift speed of the subtransmission mechanism compared with a normal coordinated shift when the improvement in the shift response of the continuously variable transmission is determined to be required and the actual through speed ratio passes the predetermined mode switch line from a Low side to a High side, the normal coordinated shift being a coordinated shift which is performed when the improvement in the shift response of the continuously variable transmission is not determined to be required and the actual through speed ratio passes the predetermined mode switch line.

12. The continuously variable transmission as defined in claim 11, wherein the shift speed varying means modifies the destination through speed ratio to the High side and increases the shift speed of the subtransmission mechanism compared with the normal coordinated shift when the improvement in the shift response of the continuously variable transmission is determined to be required and the actual through speed ratio passes the predetermined mode switch line from the Low side to the High side.

13. The continuously variable transmission as defined in claim 11, wherein the shift response improvement requirement determining means determines that the improvement in the shift response of the continuously variable transmission is required when an opening of an accelerator pedal of the power source is greater than a predetermined opening.

14. The continuously variable transmission as defined in claim 11, wherein the shift response improvement requirement determining means determines that the improvement in the shift response of the continuously variable transmission is required when the vehicle is traveling uphill.

15. The continuously variable transmission as defined in claim 11, wherein the shift response improvement requirement determining means determines that the improvement in the shift response of the continuously variable transmission is required when an oil temperature of the continuously variable transmission or a temperature of a frictional engagement element constituting the subtransmission mechanism is higher than a predetermined temperature.

* * * * *